C. E. RATCLIFFE.
NUT LOCK.
APPLICATION FILED JULY 3, 1915.

1,189,622.

Patented July 4, 1916.

WITNESSES:
Jas. K. McCathran
Watts F. Estabrook

Charles E. Ratcliffe, INVENTOR

BY

Attorney

UNITED STATES PATENT OFFICE.

CHARLES E. RATCLIFFE, OF PADUCAH, KENTUCKY.

NUT-LOCK.

1,189,622. Specification of Letters Patent. Patented July 4, 1916.

Application filed July 3, 1915. Serial No. 37,903.

*To all whom it may concern:*

Be it known that I, CHARLES E. RATCLIFFE, citizen of the United States, residing at Paducah, in the county of McCracken and State of Kentucky, have invented a new and useful Nut-Lock, of which the following is a specification.

This invention relates to an improvement in nut locks.

The object of the present invention is to provide a simple, inexpensive and efficient device capable of locking a nut upon a bolt and preventing it from being accidentally unscrewed by vibration.

This invention consists of a lock nut of the compound variety, that is, it consists of two diverging members or parts, each part or member having a screw-threaded opening whereby either part can be brought into engagement with the nut for locking the nut against movement.

The invention consists of certain novel features of construction and combinations of parts, which will be hereinafter described and pointed out in the claims.

Figure 1:
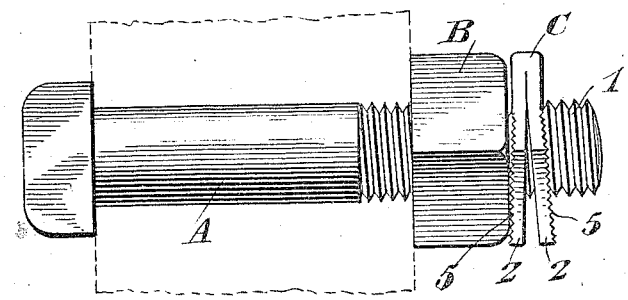
Figure 2:
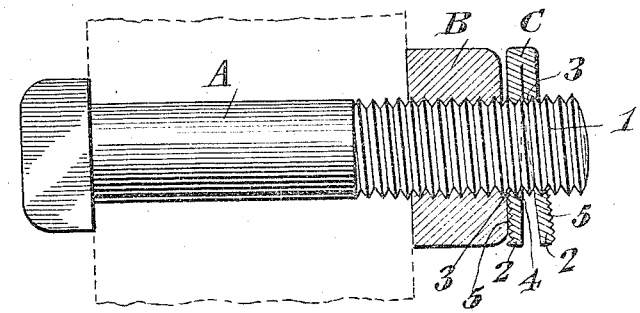
Figure 3:
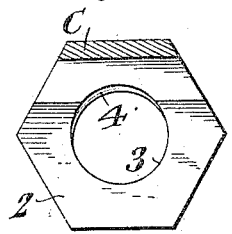
Figure 4:
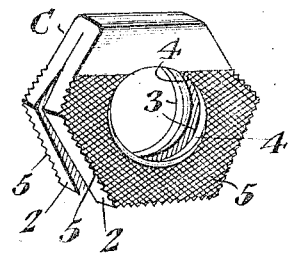

In the accompanying drawings,—Figure 1 is a view in elevation showing the invention applied to a bolt and in engagement with a nut. Fig. 2 is a longitudinal vertical sectional view through the nut and lock nut, showing them applied to a bolt, the bolt being shown in elevation. Fig. 3 is a sectional view through the lock nut, showing the inner surface of one of the parts. Fig. 4 is a perspective view of the lock nut.

A represents the bolt, and B is the nut having screw-threaded engagement with the threads 1 of the bolt A. The lock nut C is formed of two diverging parts or members 2, which are provided with openings 3. The walls of the openings are screw-threaded, as at 4. The screw-threads are tapped perfectly straight through the lock nut, so that both parts may be screwed upon the bolt and either brought into engagement with the nut B for locking it against rotation.

The outer surface or edge of the lock nut C is preferably made in the shape of a hexagon, so that a wrench can be readily applied thereto for screwing it tightly against the nut B. The outer faces of each of the parts or members 2 are milled or corrugated, as at 5, for producing a roughened surface to insure a positive engagement between a part 2 and the nut B. The lock nut C is constructed from a piece of spring metal, slitted from one side nearly to the opposite side, forming two parts of equal dimensions, and then bent outwardly defining a V-shaped space which separates the diverging parts 2. When the lock nut C is screwed upon the bolt A and comes against the nut B, the inner part contacting with the nut B, will be moved toward the other part causing it to tightly engage the thread 1 of the bolt, and lock the nut B from turning. It requires but a slight movement of the part 2 of the locking nut to firmly lock the same on the threads of the bolt. The locking device C may be applied to the bolt with either part or member facing the nut B.

It will be seen from the foregoing that I have provided a very simple construction in which the nut lock is made from a single piece of material, and in which no damage is done to the threads of the bolt when locking the nut.

What is claimed is,—

1. In combination with a threaded bolt and nut, a lock nut formed of a single piece of metal in polygonal form slitted from one side nearly to the opposite side, so as to form two parts or members of equal dimensions, said parts being bent outwardly defining a V-shaped space separating the diverging parts, said parts having alined threaded openings permitting the lock nut to be screwed upon the bolt with either part facing the nut to be locked, whereby the contacting of one of the parts against the nut causes it to be forced outwardly toward the other part thereby effecting a locking engagement with the threads of the bolt.

2. A nut lock comprising a two-part member, the parts of which are united at one side and diverge toward the opposite side, said member having a screw threaded bore extending coaxially through the member, and being adapted to be turned up on the threaded end of a bolt, whereby to engage one of the parts against a nut, the opposite part, upon the further rotation of the member, being canted on the bolt to bind against the threads thereof and secure the member from retrograde movement.

3. A nut lock comprising a two part member united at one side and having the parts thereof diverging toward the opposite side of the member, the parts each having a screw threaded bore concentric with the axis of the member; said member being adapted to be secured upon a bolt against a nut thereon, the part adjacent the nut being wedged between the threads of the bolt and the nut and the opposite part being canted on the bolt to bind against the threads and the first part and secure the member from retrograde movement.

4. A nut lock comprising a V-shape member having a transverse threaded bore extending co-axially through the member in both parts thereof, said member being adapted to be threaded upon a bolt, and turned up against a nut on the bolt whereby to wedge one part of said member against the nut and cant the opposite member on the bolt to bind against the threads thereof and lock the member against retrograde movement.

5. A nut lock comprising a V-shape member having a transverse threaded bore extending co-axially through the member in both parts thereof, said member being adapted to be threaded upon a bolt and turned up against a nut on the bolt whereby upon the further turning of the member the parts thereof are canted upon the bolt to bind against the threads thereof.

In testimony, that I claim the foregoing as my own, I have hereto affixed my signature in the presence of two witnesses.

CHARLES E. RATCLIFFE.

Witnesses:
FRANCES O. JOHNSON,
I. B. HOWELL.